US008480491B2

(12) United States Patent
Burgess et al.

(10) Patent No.: US 8,480,491 B2
(45) Date of Patent: Jul. 9, 2013

(54) GAME CONTROLLER

(75) Inventors: Simon Burgess, Loughborough (GB); Duncan Ironmonger, Atlanta, GA (US)

(73) Assignee: Ironburg Inventions Ltd., Wincanton, Somerset (GB)

( * ) Notice: Subject to any disclaimer, the term of this patent is extended or adjusted under 35 U.S.C. 154(b) by 0 days.

(21) Appl. No.: 13/163,368

(22) Filed: Jun. 17, 2011

(65) Prior Publication Data
US 2012/0322555 A1    Dec. 20, 2012

(51) Int. Cl.
*A63F 9/24* (2006.01)
*A63F 13/00* (2006.01)

(52) U.S. Cl.
USPC .............................................. 463/37; 463/36

(58) Field of Classification Search
USPC ................. 463/36–39, 47; 345/156–172
See application file for complete search history.

(56) References Cited

U.S. PATENT DOCUMENTS

| | | | | |
|---|---|---|---|---|
| 3,773,026 A * | 11/1973 | Romero | ......................... | 124/22 |
| 4,254,951 A * | 3/1981 | De Laney | .................... | 463/47.1 |
| 4,489,938 A * | 12/1984 | Darzinskis | ..................... | 463/38 |
| 6,053,814 A * | 4/2000 | Pchenitchnikov et al. | ...... | 463/36 |
| 6,203,432 B1 * | 3/2001 | Roberts et al. | .................. | 463/37 |
| 7,407,439 B1 * | 8/2008 | Ochoa | .............................. | 463/37 |
| 7,758,424 B2 * | 7/2010 | Riggs et al. | ..................... | 463/37 |
| 2002/0052237 A1 * | 5/2002 | Magill | ............................. | 463/38 |
| 2003/0195046 A1 * | 10/2003 | Bartsch | ............................ | 463/49 |
| 2005/0124416 A1 * | 6/2005 | Hammond et al. | ............. | 463/37 |
| 2005/0255918 A1 * | 11/2005 | Riggs et al. | ..................... | 463/37 |
| 2007/0293318 A1 * | 12/2007 | Tetterington et al. | ........... | 463/37 |
| 2010/0298053 A1 * | 11/2010 | Kotkin | ............................ | 463/37 |
| 2012/0142418 A1 * | 6/2012 | Muramatsu | ..................... | 463/37 |

* cited by examiner

*Primary Examiner* — Milap Shah
(74) *Attorney, Agent, or Firm* — Parks IP Law LLC

(57) ABSTRACT

A game controller for controlling video games or other electronic interactive systems, having an adjustable trigger system for calibration or customized control of trigger action. The game controller includes a controller chassis and an actuator system, which includes a trigger body, a trigger mechanism chassis, a strike plate coupled to the trigger body, a first trigger adjustment control screw received in a screw thread disposed within the controller chassis, and a second trigger adjustment control screw received in a screw thread disposed within the controller chassis, wherein a portion of each of the first trigger adjustment control screw and second trigger adjustment control screw engages with a respective portion of the strike plate, and said portion of each of the first trigger adjustment control screw and second trigger adjustment control screw each create an end stop to limit the actuator movement of the trigger body.

17 Claims, 4 Drawing Sheets

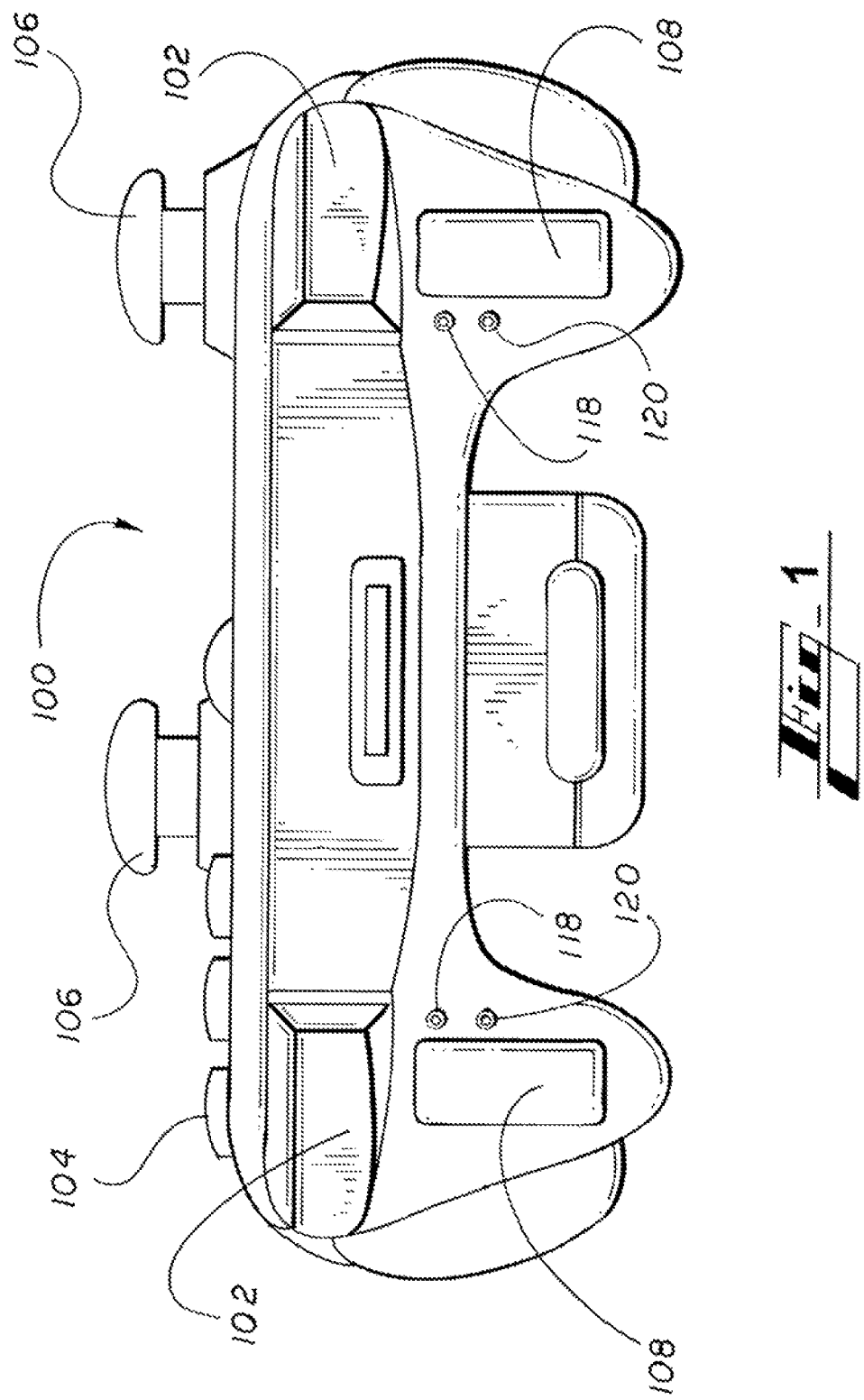

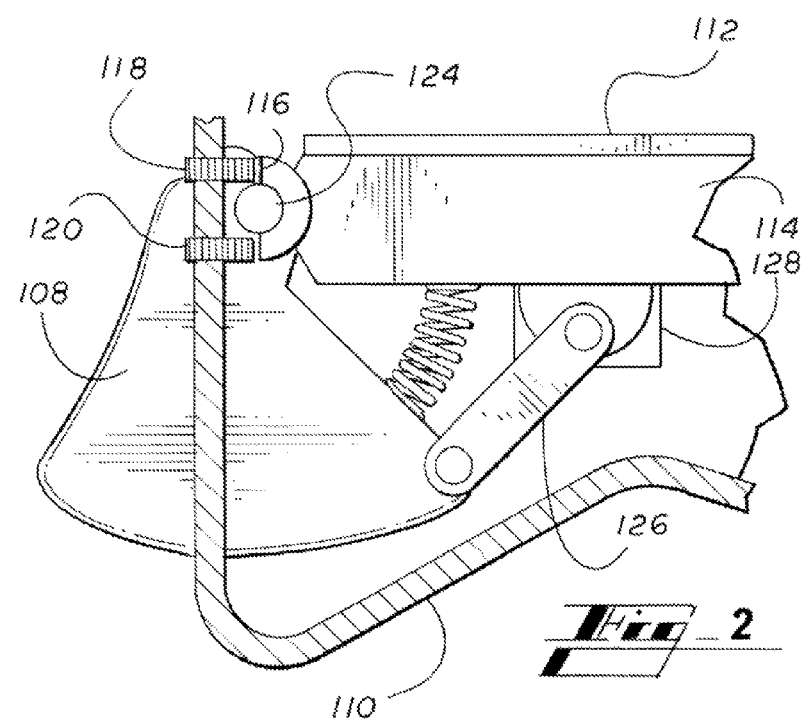
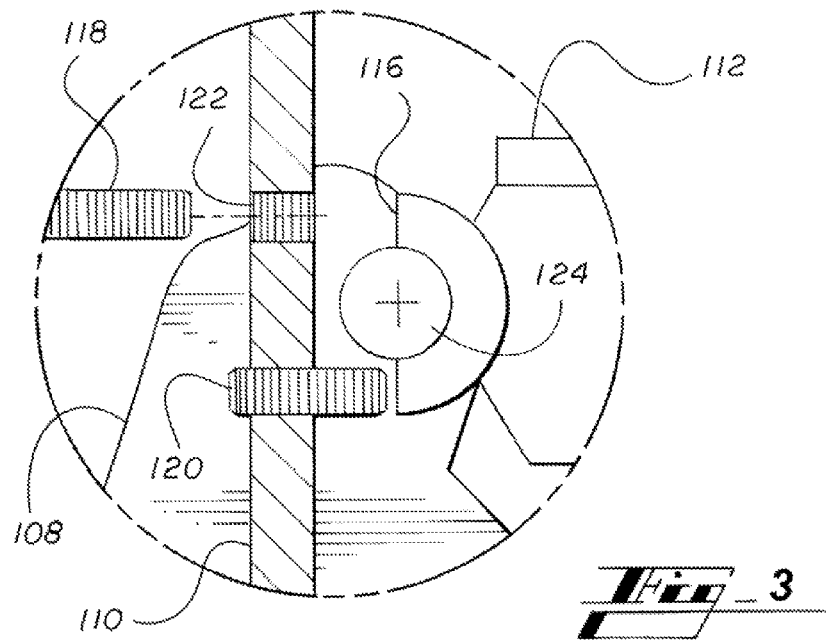

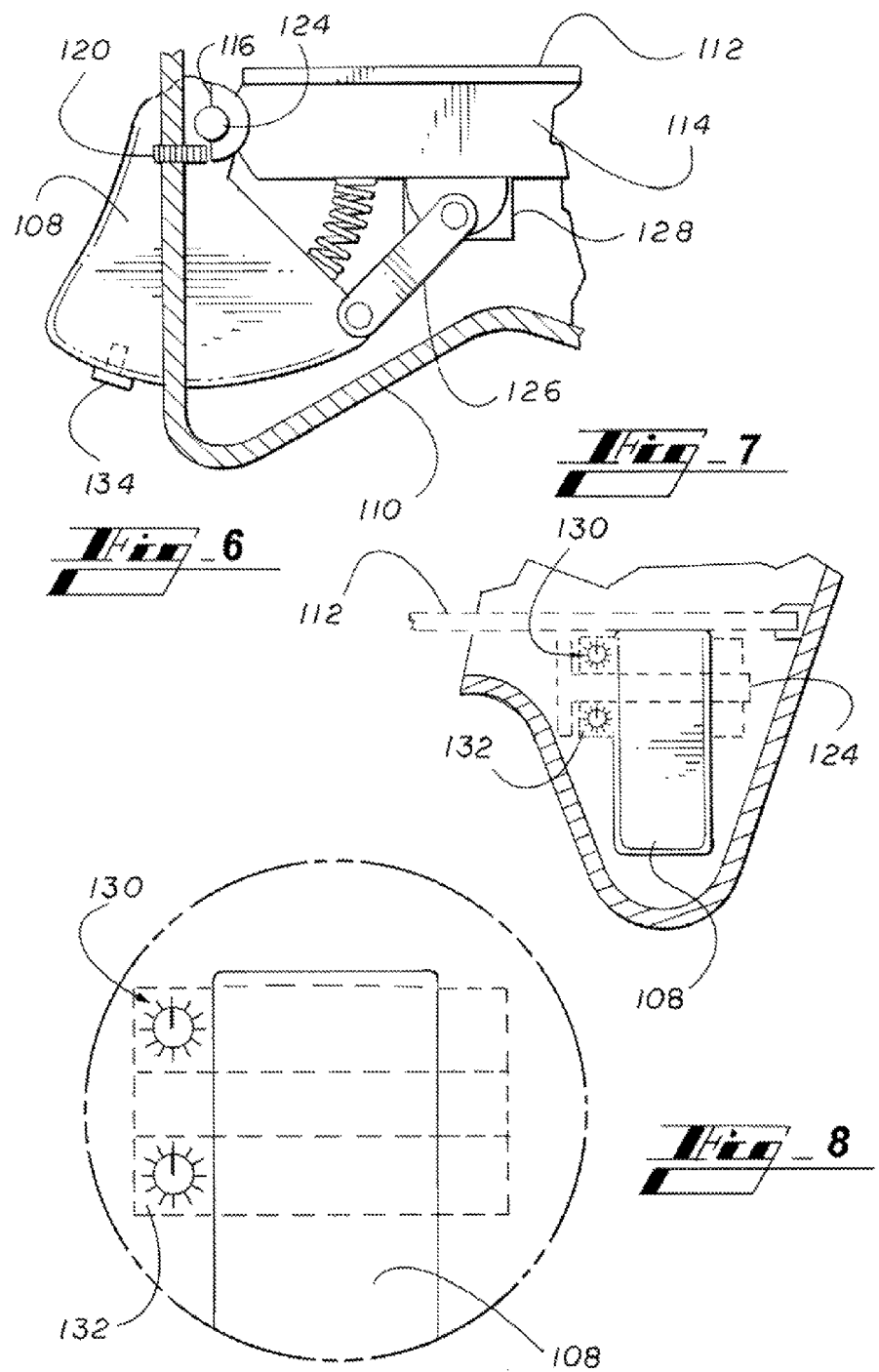

GAME CONTROLLER

TECHNICAL FIELD

The invention relates to controllers for controlling the play of computerised games, more particularly but not exclusively, the invention relates to an actuator system of a game controller for a gaming console.

BACKGROUND

There are many different types of gaming consoles currently available for operating a video game. For example, Microsoft®, Sony® and Nintendo® manufacture the Xbox®, Playstation® and Wii® gaming consoles, respectively. The gaming consoles typically include a game controller so that a user can control the operation of the video game.

Some known game controllers include a form of actuator system for the operation of control of the functions of the video games. Actuators, buttons or other depressible or manually operable devices are typically used for controlling discrete actions such as the firing of a weapon or an attack command. It is known to provide a button or actuator which is intended to be operable by the index finger of a user; such buttons are commonly known as triggers.

At times, dependent upon the video game being played, it can be necessary to depress the trigger a distance before the trigger initiation point is reached and the command actually acknowledged. This renders part of the depressing action futile. Likewise, after the command has been operated, it is often possible to carry out further depression of the trigger past the trigger initiation point. This further depression is unnecessary and may also be disadvantageous.

Furthermore, in other situations in some video games, the strength of a command is increased or decreased dependent upon how frequently the trigger is depressed. As such, depressing the trigger the whole distance is unnecessary and excessive for the command or operation required.

It is desirable to have a controller, particularly for gaming applications, that is more responsive or has less scope for allowing unnecessary over-movement by the user of the controller.

Due to the rapidly expanding gaming market and development of involved games invoking considerable player input, it is desirable for players to be able to customise their controllers in order to gain increased control in a variety of gaming circumstances.

The present invention seeks to improve upon or at least mitigate some of the problems associated with controllers of the prior art by providing a game controller, which includes an adjustable trigger system that has a mechanism to allow the end user to control or recalibrate the maximum and/or minimum trigger positions.

SUMMARY

There are a variety of different commands available for the trigger functions of a game controller and the adjustable trigger system of the various embodiments of present invention now provides use within the option to customise the trigger settings to suit the individual game at the time of operation.

In some embodiments the trigger system includes adjustments for the depression of the trigger so that it is already to some degree, "depressed," before any contact is actually made with the trigger by the operator (player).

In some embodiments the trigger system includes adjustments for the amount that the trigger is depressed before there is no more motion available to be made by the operator. This removes any unnecessary distance travelled by the trigger.

The present invention provides a method of fully controlling both of the above features simultaneously for the amount of depression inflicted on the trigger without contact, and the amount of available motion to give the greatest advantage in any gaming circumstances.

In some embodiments, there would be the ability to switch the trigger adjustments between incremented settings on the threaded adjustments. This would allow the end user to quickly and accurately calibrate the triggers between customised or pre-set settings.

In some embodiments, there would be a thread cut directly into the chassis of the controller to take the threaded adjustment screws.

In other embodiments the thread in the chassis may be achieved via the fitting of a threaded insert.

There is provided an apparatus for supplying user inputs to a computer program, such as a game program, for controlling the game program, the apparatus comprising at least one depressible trigger mechanism and having a mechanism for manual adjustment of the depressible range of the trigger mechanism.

There is provided an apparatus for supplying user inputs to a computer program, such as a game program, for controlling the game program, the apparatus comprising at least one depressible trigger mechanism and having a mechanism for manual adjustment of the start position of the trigger mechanism.

There is provided an apparatus for supplying user inputs to a computer program, such as a game program, for controlling the game program, the apparatus comprising at least one depressible trigger mechanism and having a mechanism for manual adjustment of the stop position of the trigger mechanism.

There is provided a game controller for controlling electronic games, including a housing, at least one depressible trigger at least in-part exposed relative to the housing, said at least one depressible trigger being in operational association with electrical circuitry contained within the housing which electrical circuitry is controlled by depression of the each depressible trigger for manipulating electrical outputs of the circuitry for controlling electronic games and having a mechanism for manual adjustment of the depressible range of the trigger mechanism.

There is provided a game controller for controlling electronic games, where the game controller includes a controller chassis, a trigger body, a trigger mechanism chassis, a strike plate coupled to the trigger body, a first trigger adjustment control screw received in a screw thread disposed within the controller chassis, and a second trigger adjustment control screw received in a screw thread disposed within the controller chassis. A portion of each of the first trigger adjustment control screw and second trigger adjustment control screw engages with a respective portion of the strike plate and said portion of each of the first trigger adjustment control screw and second trigger adjustment control screw each create an end stop to limit the trigger movement.

Preferably the strike plate is integral with the trigger body.

There is additionally provided a method of adjusting the range of movement of a button on a game controller for controlling electronic games. The method includes providing a game controller including a controller chassis, a trigger body, a trigger mechanism chassis, a strike plate coupled to the trigger body, a first trigger adjustment control screw received in a screw thread disposed within the controller chassis, and a second trigger adjustment control screw received in a screw thread disposed within the controller chassis. In accordance with an aspect of the exemplary method, a portion of each of the first trigger adjustment control screw and second trigger adjustment control screw engages with a respective portion of the strike plate and said portion of each of the first trigger adjustment control screw and second trigger adjustment control screw each create an end stop to limit the trigger movement rotating one of said first trigger adjustment control screw or second trigger adjustment control screws to adjust the position of the end stop.

BRIEF DESCRIPTION OF THE DRAWINGS

Exemplary embodiments of the invention will now be described with reference to the accompanying drawings, in which:

FIG. 1 is a front view of a game controller.

FIG. 2 is a cut-away side view of the trigger mechanism according to a first illustrated embodiment of the invention;

FIG. 3 is an enlarged view of FIG. 2 showing the trigger mechanism of FIG. 2;

FIG. 6 is a side view of a trigger mechanism according to a second embodiment of the invention showing another mechanism for adjusting trigger travel motion;

FIG. 7 is a front view depicting a trigger mechanism according to a third embodiment having incremental trigger calibration; and FIG. 8 is an enlarged view of the trigger mechanism system shown in FIG. 7.

DETAILED DESCRIPTION OF THE INVENTION

Figure 4:
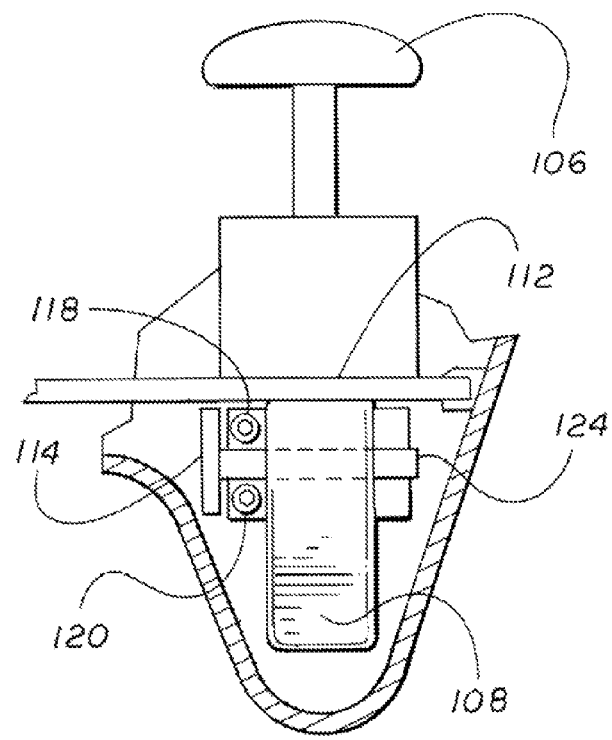
FIG. 4 is a cross-sectional of view taken through the front of the trigger mechanism.
Figure 5:
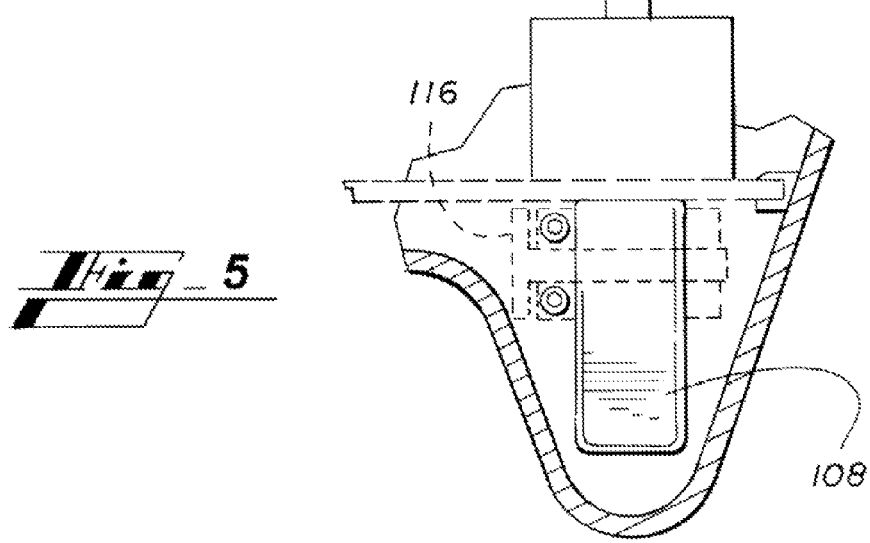
FIG. 5 is a full front profile showing hidden detail of trigger mechanism.

Detailed descriptions of specific embodiments of the game controller and its trigger mechanisms are disclosed herein. It will be understood that the disclosed embodiments are merely examples of the way in which certain aspects of the invention can be implemented and do not represent an exhaustive list of all of the ways the invention may be embodied. Indeed, it will be understood that the game controller and its trigger mechanisms described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

FIG. 1 is exemplary of a game controller 100 in which the present invention could be employed. The game controller 100 includes a bumper control function 102, button control functions 104, analogue joystick controls 106, and a trigger body 108. FIG. 1 illustrates the positions of the trigger body 108 in relation to the position of the aforementioned features of the game controller 100.

FIG. 2 is a cut-away view of part of the game controller 100 illustrating an adjustable trigger mechanism according to a first embodiment of the invention. The game controller 100 also includes a controller chassis 110, which encloses its internal components. The trigger body 108 can extend at least partially through an opening in the controller chassis 110. Referring now also to FIGS. 3-8, the game controller 100 also includes:

a printed circuit board (PCB) 112;
a trigger mechanism chassis 114 fixed to the PCB 112;
an adjustment strike plate 116 integral to the trigger body 108;
a first trigger adjustment control screw 118 for adjustment of trigger depression;
a second trigger adjustment control screw 120 for adjustment of the trigger command initiation point;
a threaded insert or screw thread 122 cut into the controller chassis 110;
a trigger pivot bearing 124 integrally formed with the trigger mechanism chassis;
a trigger sensor link arm 126; and
a trigger motion sensor 128.

FIG. 3 is an enlarged section of FIG. 2 showing in more detail the trigger adjustment mechanism in accordance with the invention.

FIG. 4 is a cross sectional view of the trigger mechanism. In this embodiment the trigger mechanism has two trigger adjustment control screws 118, 120; first trigger adjustment control screw 118 for adjustment of trigger depression, and second trigger adjustment control screw 120 for adjustment of trigger command initiation point as shown in FIG. 2 respectively.

In this embodiment the first and second trigger adjustment control screws 118 and 120 that are used are grub screws but could be many different threaded mechanisms.

In this embodiment the screw thread 122 for receiving the screw mechanisms is cut into the chassis 110 of the game controller 100 as shown in FIGS. 2 and 3, respectively. In other embodiments, it would be possible to use threaded inserts with nylon locking systems or entire adjustment mechanisms 130, 132 fitted as a complete component that could be inserted through an aperture in the controller chassis 110 in such embodiment it is envisaged that the user may be able to adjust the trigger settings without the use of a tool, for example by providing a grip coupled to the screw thread, preferably this would be integral with the screw thread as shown in FIGS. 7 and 8.

In some embodiments, the position of the trigger body 108 would be adjusted by use of a specified tool that would be provided to turn the first and second trigger adjustment control screws 118 and 120, which are located next to the trigger body 108, on the controller chassis 110.

One advantage of the present invention is that it allows adjustments to be made to the trigger response; such adjustment could be customised to suit the nature of the video game that is in use at the time of operation and the skill of the operator. For example, in combat style games involving a shooting function it is often the case that the trigger would need to be depressed a certain amount before any command was prompted. The second trigger adjustment control screw 120 can be adjusted so that the command was prompted with any amount of depression of the trigger body 108, by using the required tool (for example an Allen key, or hex or star driver, cross head or flat head screwdriver, spanner or wrench) to turn the second trigger adjustment control screw 120, whereby driving it into or out of the controller chassis 110 by virtue of the threaded insert or screw thread located within controller chassis 110.

After reaching or passing the command initiation point no further commands are given from the trigger sensor link arm 126 to the trigger motion sensor 128; therefore the first trigger adjustment control screw 118 which controls the degree of trigger depression allows the operator to restrict the amount of travel available to the trigger body 108, as they desire. The first trigger adjustment control screw 118 would impede the movement by striking the adjustment strike plates, which are preferably formed integrally with the trigger body 108, which trigger body 108 is pivotally mounted preferably on a trigger pivot bearing which may also be integral to trigger mechanism chassis 124.

Such an adjustment would directly relate to the majority of combat style games or other varieties of firing operations in video games.

The present invention could find application in a variety of other video games genres but for the simplicity of this disclosure reference is made to combat style games.

A further advantage of the present invention is that it minimises the amount of motion an operators finger must travel, therefore minimising the recovery time after trigger initiation contacts have been made allowing the operator to commence command prompt again and again more rapidly, or to operate different commands quicker. As the movement that is required to operate commands detected by the trigger motion sensor 128, by depressing the trigger body 108, the risks of any related repetitive strain injury acquired due to the repeated movement of the finger when operating the trigger function would be greatly reduced. In known controllers the operator may be require to move their finger 11 mm whereas in the present invention adjustment of the first trigger adjustment control screw 118 and the second trigger adjustment control screw 120 allow the operator to reduce the required movement of their finger to 5 mm thus reducing the overall motion required by the operator by over 50% of the initial movement required, whereby providing a health benefit to users retaining healthy joints after many years of vigorous gaming. Repetitive strain injury is a clinically proven medical issue related to hours of repeated movements made during activities like the movements made while depressing the trigger function of the controller.

In other video game genres, such as driving games, trigger response could be controlled by adjustment of the first trigger adjustment control screw 118 and the second trigger adjustment control screw 120 to allow the operator greater control over breaking and accelerating functions of the game, for example restricting maximum throttle settings and breaking level settings for difficult corners. This could be adjusted by assessing where the greatest advantageous breaking or accelerating position would be, and then recreating this position with the trigger adjustment control screw for adjustment of trigger depression 118.

In this application the degree of the trigger body 108 depression is detected by trigger motion sensor 128 which are coupled together by the trigger sensor link arm 126. The degree of depression of the trigger body 108 is converted into a signal which signal directly relates to a command to be executed by the video game for example the amount of acceleration or braking to be applied. The trigger motion sensor 128 is connected to the trigger mechanism chassis 114 coupled to the printed circuit board 112. The present invention provides a device to restrict the range of movement of the trigger body 108 which the trigger motion sensor 128 is effectively able to detect, and thus limit the magnitude of the command which can be made by the operator when depressing trigger. A further advantage of this embodiment is that the ergonomic design of the controller is not compromised.

FIG. 6 depicts the use of a stopping block 134 for control of trigger depression, this could be achieved by insertion into the base of the trigger of a screw comprising screw head which interacts with controller chassis 110. This system could be used instead of the trigger adjustment control screw 118 for adjustment of trigger depression. This system may incorporate a stopping block of the desired shape and size to prevent the trigger from depressing fully and this would be attached via a screw fixing into a threaded portion of the trigger body 108, or by any other means of mechanical fixing such as those that would be apparent to those skilled in the art. The stopping block 134 could be interchangeable with stopping blocks or different dimensions depending on the intended application and the degree to which movement of the trigger is to be restricted. The screw head itself may be shaped such that the angular orientation of the screw with respect to the controller chassis 110 determines the degree of trigger movement, for example the outer surface of the screw head could be any noncircular shape such as oval or spiral shape, wherein the radial dimension of the screw head is not constant. In such embodiment is envisaged that trigger adjustment control screw 120 may also be employed in order to provide adjustment of trigger command initiation point to achieve fully adjustable trigger commands.

It can be appreciated that various changes may be made within the scope of the various embodiments of present invention, for example, the size and shape of the features may be adjusted. In other embodiments of the invention it is envisaged that a system could incorporate several button or slider controls on the external case of the controller which may be adjusted to select pre-set ranges of movement, or pre-set trigger depression or preset trigger initiation command points. Each of these could be pre-set in manufacture or by the operator to correspond to popular video games or specifically chosen video games that the operator has chosen for maximum efficiency. It is also envisaged this invention could be used for other buttons provided on the controller. It is envisaged the invention could be employed with digital sensors or switches which generate digital signals having an on state and an off state since such switches typically require a predetermined range of movement to change states such that required range of movement to change states can be reduced. It is also envisaged this invention could be incorporated to adjust the button depression depth required of such digital switches to its greatest point before such a command for the function it controls would be given.

In some embodiments the first trigger adjustment control screws 118 and the second trigger adjustment control screw 120 can be entirely released restoring the full range of trigger movement.

It will be recognised that as used herein, directional references such as "top", "bottom", "front", "back", "end", "side", "inner", "outer", "upper" and "lower" do not limit the respective features to such orientation, but merely serve to distinguish these features from one another.

While particular embodiments of the invention have been shown and described, numerous variations and alternate embodiments will occur to those skilled in the art without departing from the scope of the present invention.

The invention claimed is:

1. A game controller for supplying user inputs to a computer program, comprising:
   a controller chassis:
   a depressible trigger mechanism; and
   a mechanism for manual adjustment of the depressible range of the trigger mechanism, the mechanism for manual adjustment comprising:
      a first mechanism for adjustment of the start position of the trigger mechanism, the first mechanism comprising a first adjustment screw received in a first screw thread disposed within the controller chassis; and a second mechanism for adjustment of the stop position of the trigger mechanism, the second mechanism selected from a group consisting of:
- a second adjustment second screw received in a screw thread disposed within the controller chassis; and
- a stopping block adjustably attached to the trigger mechanism, wherein the stopping block is configured to interact with the controller chassis.

2. The game controller of claim 1, wherein the stop position is a point of maximum trigger depression.

3. The game controller of claim 1, wherein the start positions is a point of command initiation.

4. The game controller of claim 1, the mechanism for manual adjustment comprising a strike plate.

5. The game controller of claim 4, wherein the strike plate is pivotably mounted.

6. The game controller of claim 1, further comprising a trigger motion sensor that is configured to measure degree of depression of the trigger mechanism.

7. The game controller of claim 1, wherein the trigger motion sensor is coupled to the trigger mechanism by a trigger sensor link arm.

8. The game controller of claim 1, further comprising means for biasing the depressible trigger mechanism against the first mechanism for adjustment.

9. A game controller for controlling electronic games comprising:
- a controller chassis; and
- an actuator system including:
  - an actuator body;
  - a strike plate coupled to the actuator body;
  - a first actuator adjustment control screw received in a screw thread disposed within the controller chassis;
  - a second actuator adjustment control screw received in a screw thread disposed within the controller chassis;
  - wherein a portion of each of the first actuator adjustment control screw and the second actuator adjustment control screw is configured to engage with a respective portion of the strike plate and
  - wherein the portion of the first actuator adjustment control screw is configured to create an end stop to limit movement of the actuator body in a first direction and the portion of the second actuator adjustment control screw is configured to create an end stop to limit movement of the actuator body in a second direction, wherein the first direction is substantially opposed to the second direction.

10. The game controller of claim 9, wherein the strike plate is integral with the actuator body.

11. The game controller of claim 9, wherein the actuator is a trigger button.

12. The game controller of claim 9, further comprising a motion sensor that is configured to measure degree of depression of the actuator body.

13. The game controller of claim 12, wherein the motion sensor is coupled to the actuator body by a sensor link arm.

14. The game controller of claim 9, further comprising means for biasing the actuator body in one of the first direction and the second direction.

15. A game controller, comprising;
- a controller chassis;
- an actuator body;
- a strike plate coupled to the actuator body;
- a first actuator adjustment control screw that is received in a first screw thread disposed within the controller chassis, wherein the first actuator adjustment screw is configured to adjustably define a command initiation point of a range of depression of the actuator body; and
- a second actuator adjustment control screw that is received in a second screw thread disposed within the controller chassis, wherein the second actuator adjustment screw is configured to adjustably define a maximum depression point of the range of depression of the actuator body;
- wherein each of the first actuator adjustment control screw and the second actuator adjustment control screw is configured to contact the strike plate.

16. The game controller of claim 15, further comprising means for biasing the actuator body towards the command initiation point.

17. The game controller of claim 15, further comprising a motion sensor that is configured to measure degree of depression of the actuator body.

* * * * *